TOTAL INDICATED READING COMPARATOR CIRCUIT
Filed March 19, 1968
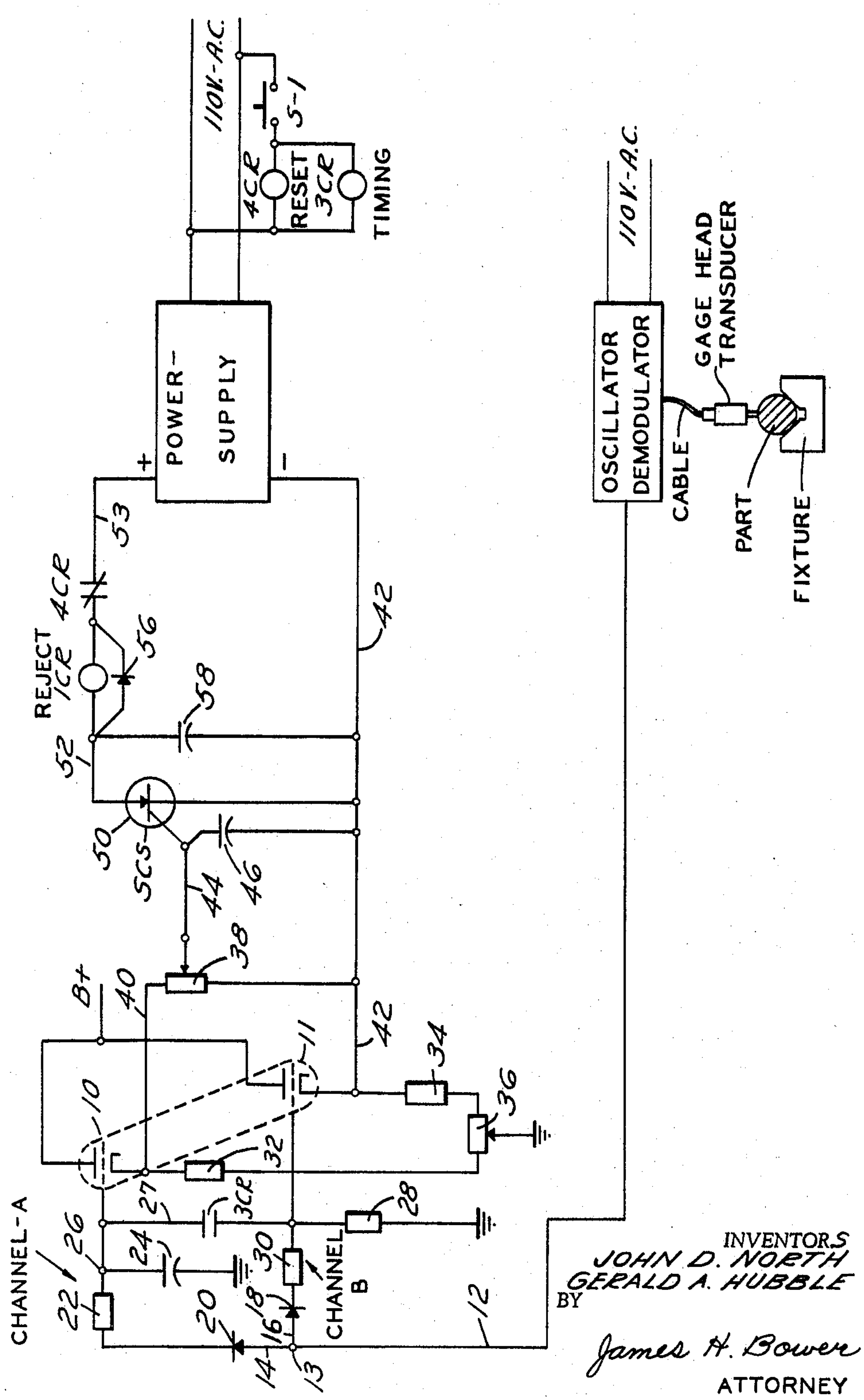
INVENTORS
JOHN D. NORTH
GERALD A. HUBBLE
BY
James H. Bower
ATTORNEY

United States Patent Office 3,481,466

Patented Dec. 2, 1969

3,481,466

TOTAL INDICATED READING COMPARATOR CIRCUIT

John D. North, Troy, and Gerald A. Hubble, Detroit, Mich., assignors to Micromatic Hone Corporation, Detroit, Mich.

Filed Mar. 19, 1968, Ser. No. 714,274
Int. Cl. B07c *5/04, 1/10;* A61b *5/10*
U.S. Cl. 209—88 4 Claims

ABSTRACT OF THE DISCLOSURE

An electrical gaging circuit to determine deviation of a workpiece by means of comparing electronic signals.

BACKGROUND OF THE INVENTION

Field of the invention

This invention relates to a gaging circuit in which a round workpiece is rotated under a gage head, and deviation in radius as the workpiece is rotated determines the rejectability or the acceptance of the workpiece. The circuit is additionally capable of detecting deviation of radius without regard to part size. However, it is understood that a workpiece having a slope can be gaged.

Description of the prior art

A known device similar to this purpose is shown in Arlin Patent No. 2,913,829, issued Nov. 24, 1959 for "Gauging Apparatus." The workpiece shown in FIG. 1 is rotated and its part size gaged. However, this known device does not indicate runout or variation in radius independent of part size, by electrical means. Furthermore, the patent has several disadvantages compared to the present invention, including the complexity of parts necessary for operation for this device, in addition to the relatively complicated construction.

Other analogous art include the Youngblood Patent No. 3,363,321, issued Jan. 16, 1967; Engle Patent No. 3,320,672, issued May 23, 1967; Youngblood Patent No. 3,308,357, issued Mar. 7, 1967; Arlin patten application Ser. No. 445,210, filed Apr. 2, 1965; now abandoned, all of which are assigned to the assignee of record.

SUMMARY OF THE INVENTION

According to the invention, a variable D.C. voltage signal, as might be obtained from a suitable transducer following the circumference of a round workpiece, is applied to the grids of parallel cathode followers. The grid circuit of one cathode follower includes a capacitor which is charged through an isolation diode and thus retains the maximum input signal until discharged at end of cycle. The grid of the other cathode follower is free to fall with any drop in input signal. The cathodes of said cathode followers are coupled by a resistive voltage divider across which appears a potential corresponding to the instantaneous difference between the maximum input signal value stored by the capacitor and the instantaneous signal value. This difference potential is applied to the control element of a trigger device, which fires upon application of sufficient potential, corresponding for example to an excessive deviation from roundness in the workpiece, causing the trigger device to activate a relay, as for rejecting the workpiece.

BRIEF DESCRIPTION OF THE DRAWING

The figure shows a schematic electrical circuit.

DESCRIPTION OF THE PREFERRED EMBODIMENT

The D.C. signal voltage is received from a suitable gage unit and is proportional to the part size. Any variation in signal as the part is rotated, is proportional to runout or variation of radius dimension.

The signal voltage on line 12 is separated via junction 13 to CHANNEL A and CHANNEL B. Diode 20 in conductor 14 of CHANNEL A prevents any signal from leaking back into conductor 12 and interfering with the signal voltage in CHANNEL B. The signal voltage in CHANNEL A passes through resistor 22 to junction 26 and thence charges capacitor 24. The signal voltage at junction 26 is the peak voltage that is produced as the workpiece or part is rotated in the part fixture. The signal voltage, isolated from ground during the gaging cycle by the open contacts 3CR in conductor 27, is applied only to the grid of tube 10. The relay contacts 3CR are normally open, and close only at the end of the gaging cycle to discharge capacitor 24, so a new cycle can begin.

The signal voltage divided at junction 13 is also applied to the grid of tube 11 through diode 18 and resistor 30 in conductor 16. It should be apparent that one path includes capacitor 24 and the other path does not. However, the signals on grids of tubes 10 and 11 are equal and identical with any constant, or increasing signal. A decreasing signal will create a differential with the previous peak value applied on capacitor 24. Load resistors 32 and 34 are common to both cathode follower systems. Potentiometer 36 is for balancing the system under static conditions so that a difference is not established or developed before the signal voltage enters the circuit. That is, the outputs of tubes 10 and 11 are equal with no signal voltage. Once this is established, potentiometer 36 is not used again, since any variation or deviation apparent from the cathode follower resistors 32 and 34 will be utilized by the trigger circuit.

Tubes 10 and 11 are connected as cathode followers by virtue of the direct connection of their anodes to a direct voltage source B+. It will be appreciated, however, that any suitable source may be employed such as any conventional form of alternating current rectifying and filtering system.

Potentiometer 38 is inserted between conductors 40 and 42, and is adjusted only to establish the amount of difference in signal voltage that will be applied to trigger silicon controlled switch SCS 50, corresponding to the deviation in radius that the circuit allows or rejects. In other words, as the part is revolving, with any increase in radius, the highest or maximum signal voltage on capacitor 24 will be established, and if the radius decreases the deviation or difference between maximum and minimum signal voltage will be impressed across potentiometer 38. When the signal voltage exceeds the value of the adjustment on potentiometer 38, voltage enters conductor 44 to trigger the silicon switch SCS 50. The voltage in conductor 40 is always equal to or higher than the voltage in conductor 42. If the voltage in conductor 40 is higher than the voltage in conductor 42, voltage goes through potentiometer 38 to conductor 44 to trigger the switch SCS 50. Capacitor 46 between conductors 44 and 42 is to provide stability to the switch SCS 50.

The silicon switch SCS 50, when triggered to the conducting tate, remains conductive until its anode potential is interrupted. That is, when the voltage in conductor 44 exceeds the voltage in conductor 42, by .68 volt or more, it triggers silicon switch SCS 50 into a conducting state and allows the POWER SUPPLY to energize REJECT relay 1CR by means of conductor 53. Energizing REJECT relay 1CR results in rejection of the part. Capacitor 58 is connected across conductors 52 and 42 to prevent false triggering by fast rising POWER SUPPLY voltage; that is, capacitor 58 allows the applied power supply voltage to increase gradually in silicon switch SCS 50. However, it is obvious that in lieu of having to trigger silicon switch SCS 50 into a conducting state, a "fail-safe" operation of switch SCS 50 is effected by maintaining SCS 50 constantly in a conducting state and deactivation of switch SCS 50 would reject the part.

To provide for recycling, or gaging the next part, switch S–1 is closed, thereby energizing RESET relay 4CR and TIMING relay 3CR. Energizing 4CR opens the normally closed contacts 4CR in conductor 53, and de-energizes the REJECT relay 1CR. When contacts 4CR open, switch SCS 50 returns to the nonconducting state, and in this state it is prepared to accept a new incoming signal voltage from the succeeding part. Diode 56 is connected across the coil of REJECT relay 1CR to absorb reverse E.M.F. when REJECT relay 1CR is de-energized.

Energizing TIMING relay 3CR closes contacts 3CR in conductor 27 and allows capacitor 24 to discharge to ground through resistor 28. This allows capacitor 24 to be devoid of any charges and in preparation for a new cycle to begin, coincident with the entry of a new part to be gaged. It is to be considered obvious to one skilled in the art that in an automatic machine the relays 3CR and 4CR would be energized automatically at appropriate times during each cycle and switch S–1 would be used only in manual operation for setup purposes.

In summary, the circuit described above is adapted to detect a runout or deviation in radius dimension without regard to part size. If the signal voltages impressed in CHANNEL A and CHANNEL B are equal, signifying no deviation or radius dimension runout on the part, then the potential difference is zero across potentiometer 38 and the part is judged acceptable. If the signal voltage exceeds the preset value of potentiometer 38, signifying that the deviation or radius dimension runout in the part is exceeded, switch SCS 50 is triggered thereby energizing REJECT relay 1CR. In other words, the circuit is adapted to recognize deviation in radius dimension on the part, and any signal exceeding the preset limit of the potentiometer 38 is adapted to trigger the switch SCS 50 and energize REJECT relay 1CR, thus rejecting the part. It is to be recognized that in lieu of relay means 1CR, any output means, such as solid state logic devices, could be utilized. This output means could be used to activate or energize a reject device.

For example, a part may have an allowable diameter tolerance of 0.003 inch and be acceptable, but be rejected if the runout or variation of radium dimension exceeds 0.0001 inch when the part rotated. Thus, it would not matter if the part was large or small (within tolerance limits) because the original part size, large or small, establishes a proportionate charge on the capacitor 24. It is therefore apparent that any increase in signal voltage caused by part rotation will merely establish a higher charge on the capacitor 24. Hence, when gaging round parts, a minimum rotation of 360° is required. Any drop in signal voltage, resulting from rotating the part in the part fixture, establishes a differential with the original charge on capacitor 24.

From the above, it is clear that the circuit herein described responds only to changes in a decreasing direction; that increasing voltages appear simultaneously in both channels and hence produce no differential across cathode follower outputs in conductors 40 and 42. For engaging parts having a slope or ramp, it may be necessary to use two of the herein described units to detect variations in both directions. In such cases, a transducer gage unit that produces two output voltages is required; one that increases and one that decreases with part size. Each output voltage is then connected to its respective T.I.R. (total indicated reading) comparator.

While the preferred embodiments of the present invention have been illustrated and described in detail, various additions, substitutions, modifications and omissions may be made thereto.

We claim:

1. An electrical circuit for sensing the deviation of a signal voltage, comprising:

(a) a capacitor;
(b) a first diode connected in series with said capacitor;
(c) a first cathode follower means connected in series with said capacitor and said first diode;
(d) a second cathode follower means;
(e) a signal voltage adjusting means connected between said first cathode follower means and said second cathode follower means adapted to sense the deviation of said signal voltage;
(f) switch means adapted to be triggered or deactivated when said signal voltage exceeds the preset maximum limit of said potentiometer; and
(g) output means adapted to be energized when said switch means is triggered or deactivated.

2. An electrical circuit for sensing the deviation of a signal voltage, comprising:

(a) a capacitor;
(b) a first diode connected in series with said capacitor;
(c) a first cathode follower means connected in series with said capacitor and said first diode;
(d) a second cathode follower means connected in parallel with said diode and capacitor and said first cathode follower means;
(e) a potentiometer connected between said first cathode follower means and said second cathode follower means;
(f) switch means adapted to be triggered when said signal voltage exceeds the predetermined setting of said potentiometer; and
(g) relay means adapted to be energized when said switch means is triggered.

3. The invention as defined in claim 1, further including:

(a) a second diode connected in series with said second cathode follower means to facilitate balance of said two cathode follower means.

4. A gaging circuit, comprising:

(a) power supply means;
(b) oscillator and demodulator means adapted to receive and transmit a signal from a part to be gaged;
(c) means for sensing the signal from said oscillator means, said sensing means including:
   (1) a capacitor;
   (2) a diode connected in series with said capacitor;
   (3) a first cathode follower connected to said capacitor and diode and adapted to receive the maximum value of said signal;
   (4) a second cathode follower adapted to receive said signal;
   (5) a potentiometer connected between said first cathode follower and said second cathode follower to sense the maximum deviation of said signal, corresponding to the runout of said gaged part;
   (6) switch means adapted to be triggered when said signal exceeds deviation limit preset in said potentiometer; and
   (7) reject means adapted to reject said gaged part when said switch means is triggered by said power supply means.

References Cited

UNITED STATES PATENTS

| | | | |
|---|---|---|---|
| 2,962,165 | 11/1960 | Aller et al. | 209—88 X |
| 3,197,027 | 7/1965 | Sargrove | 209—88 |
| 3,231,979 | 2/1966 | Perthen et al. | 33—174 |
| 3,417,476 | 12/1968 | Martens | 209—88 X |

ALLEN N. KNOWLES, Primary Examiner

U.S. Cl. X.R.

33—174